United States Patent
Fitch et al.

(10) Patent No.: US 6,660,397 B2
(45) Date of Patent: Dec. 9, 2003

(54) THERMOPLASTIC SHEET WITH SCRATCH RESISTANT SURFACE AND METHOD OF MAKING SAME

(75) Inventors: John Fitch, Warwick, RI (US); Steven J. Sargeant, Kingston, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

(21) Appl. No.: 10/080,228

(22) Filed: Feb. 21, 2002

(65) Prior Publication Data

US 2003/0162043 A1 Aug. 28, 2003

(51) Int. Cl.$^7$ .................. B32B 27/08; B32B 27/20; B32B 27/36; B32B 27/42
(52) U.S. Cl. ................ 428/480; 428/336; 428/328; 428/331; 428/910
(58) Field of Search .................. 428/480, 482, 428/336, 323, 910, 332, 334, 328, 331; 427/372.2, 384, 385.5, 393.5, 331; 264/280, 289.3, 289.6, 290.2

(56) References Cited

U.S. PATENT DOCUMENTS

| | | | |
|---|---|---|---|
| 4,310,600 A | | 1/1982 | Cross |
| 4,421,780 A | * | 12/1983 | Buzio et al. ............. 427/540 |
| 4,430,368 A | * | 2/1984 | Garland et al. .......... 427/385.5 |
| 4,751,139 A | | 6/1988 | Hensel et al. |
| 4,801,640 A | | 1/1989 | Dallmann et al. |
| 5,149,756 A | * | 9/1992 | Demarey ................ 528/230 |
| 5,415,942 A | | 5/1995 | Anderson |
| 5,466,535 A | | 11/1995 | Higgins et al. |
| 5,763,096 A | * | 6/1998 | Takahashi et al. ........ 428/480 |
| 5,852,120 A | * | 12/1998 | Bederke et al. ........... 525/124 |

FOREIGN PATENT DOCUMENTS

| | | |
|---|---|---|
| EP | 0 375 215 | 6/1990 |
| EP | 0 409 515 A2 * | 1/1991 |
| EP | 0 499 369 369 A1 * | 2/1991 |
| EP | 0 731 130 A1 | 9/1996 |
| GB | 1120467 * | 7/1968 |

OTHER PUBLICATIONS

Schimtz, Peter et al., "Films." Ullmann's Encyclopedia of Industrial Chemistry, 5th Ed., vol. A11, pp. 85–94.*
Database WPI, Section Ch, Week 198933, Derwent Publications Ltd., London, GB; AN 1989–237119, XP002241136, Jul. 6, 1989, abstract.

* cited by examiner

Primary Examiner—Vivian Chen
(74) Attorney, Agent, or Firm—Piper Rudnick LLP

(57) ABSTRACT

An abrasion resistant coated film including a polyester film coated with a highly crosslinkable melamine coating with a crosslinking density of greater than about 50% and less than about 100%, wherein the coating is cured after transverse stretching and heat setting the film, a melamine coating having a crosslinking density between about 50% and about 100% containing between about 0.01% by weight and about 1.0% by weight of a colloidal particle selected from the group consisting of silica, $TiO_2$, graphite and blends thereof, and a method of producing an abrasion resistant coated film including stretching a polyester film in the machine direction to form a uniaxially oriented film, applying a coating of highly crosslinkable melamine with a crosslinking density between about 50% and about 100% onto the uniaxially oriented film, heating and stretching the coated film in the transverse direction and curing the coating on the coated film.

4 Claims, No Drawings

THERMOPLASTIC SHEET WITH SCRATCH RESISTANT SURFACE AND METHOD OF MAKING SAME

BACKGROUND

Polyethyleneterephtlate films (PET films) are used for a host of converting, printing, coating and metallizing applications. The thermal stability, dimensional stability, chemical resistance and relative high surface energy of polyethyleneterephtlate films are beneficial for typical end-use applications. For instance, polyethyleneterephtlate films are often used as coating bases for magnetic tape, thermal transfer ribbon, packaging materials, thermal lamination and many other web converted products.

Roll formed PET films are typically handled by converting processes involving roller trains. It is not uncommon for the PET films to slip or drag on the roller trains in the use of the PET films during converting operations, causing scratching on the film surfaces. In severe cases these scratches will render the PET films unusable or require the converted materials to be downgraded and sold as off-spec materials. Furthermore, in end-use applications it is not uncommon for the handling of converted PET films to result in scratching of the materials. Such applications in which surface scratches are not desirable include solar control window films, label uses, touch panel display, packaging and other graphic uses of PET film. Therefore, it is desirable to have PET films with a scratch resistance surface to improve the handling of the film in a conventional converting process.

Previously, prior art technology that attempted to render PET films more scratch and abrasion resistant involved either an inline process at the point of film manufacture, or and offline process done at the point of converting. In the case of inline processes utilized during film making, references in the prior art include descriptions of acrylic coating the film to improve abrasion resistance. Other efforts describe the use of specific inorganic or organic particles in the upper surfaces of the PET films. Further inline efforts include manufacturing PET films with increased crystallinity in the upper surfaces to improve the abrasion resistance of the materials. However, they do not render the PET film highly abrasion resistance. Therefore, extensive off-line converting solutions have been developed.

Previous solutions to render PET scratch resistant involve offline coating of PET films with a hardened surface coating. Such coating may consist of highly crosslinked acrylics, silicones, or inorganic chemistry like sol-gel coatings. For many applications, these offline-coated materials render the PET film highly scratch resistant. However, the relatively high cost of the offline converting of the PET to render the surface scratch resistant is a disadvantage. Therefore, there is a significant commercial need to manufacture PET films that are inherently scratch resistant via the utilization of a low cost and robust inline process.

Furthermore, many applications for PET films take advantage of the surface printability of the PET material. Labels, packaging materials, graphics and many other applications take advantage of this. However, many prior solutions to hardcoating the PET film to improve the abrasion resistance often render the PET film surface unprintable. Therefore, there is a commerical need for a low cost, scratch resistant polyester film with improved print receptivity.

DESCRIPTION OF LOCATED PRIOR ART

U.S. Pat. No. 5,415,942 describes a biaxially oriented polyethylene terephthlate film having an abrasion resistant surface prepared by crosslinking an acrylic emulsion.

U.S. Pat. No. 4,801,640 describes a biaxially oriented polyester film having an abrasion resistant surface. The surface of the polyester film is made abrasion resistant via the inclusion of crosslinked organic particles and containing a crystallization nucleating agent.

U.S. Pat. No. 4,751,139 describes abrasion resistant polyester film prepared via processing conditions such that greater surface crystallization and thus better abrasion resistance is achieved.

U.S. Pat. No. 4,310,600 describes the construction of an abrasion resistant polyester film via surface coating the film with a silicone coating containing colloidal silica. Furthermore, the coating contains unsaturated acrylate monomers and/or oligomers. Book—"50 Years of Amino Coating Resins" American Cyanamid Company, 1986.

SUMMARY OF THE INVENTION

This invention relates to an abrasion resistant coated film including a polyester film coated with a highly crosslinkable melamine coating with a crosslinking density of greater than about 50% and less than about 100%, wherein the coating is cured after transverse stretching and heat setting the film.

This invention also relates to a melamine coating having a crosslinking density between about 50% and about 100% containing between about 0.01% by weight and about 1.0% by weight of a colloidal particle selected from the group consisting of silica, TiO2, graphite and blends thereof.

This invention further relates to a method of producing an abrasion resistant coated film including stretching a polyester film in the machine direction to form a uniaxially oriented film, applying a coating of highly crosslinkable melamine with a crosslinking density between about 50% and about 100% onto the uniaxially oriented film, heating and stretching the coated film in the transverse direction and curing the coating on the coated film.

DETAILED DESCRIPTION

We discovered a method to render PET films scratch resistant by use of a highly crosslinked inline coating. As is well known in the art, stretching a crosslinked coating is difficult and often renders the coating cracked. At higher draw ratios the physical integrity of the coating will be compromised. For instance, a cracked surface coating will result in an increased haze and reduce the applications for the scratch resistant materials. However, we discovered a method to produce scratch resistant films that overcome the previous limitations of cracking of a highly crosslinked coating. Such a discovery results in a clear surface coating that gives the polyester film a highly scratch resistant surface.

In our discovery, the coating is applied between the first and second stretching operations in the PET film manufacturing process. The coating is applied via any method convenient and well known in the art, such as via Mayer rod coating, Gravure coating, roll coating, die coating or other application and doctoring processes. As the coating enters the stenter, or stretching and heat setting ovens, the coating is dried to at least substantially completely remove water. After the water is removed, the coated PET film is then transversely stretched by about a ratio of between about 3 and about 4. Hence, the coating is also stretched the same amount as the carrier PET film.

During the drying phase, curing of the coating is accomplished. Curing of a highly crosslinked coating results in stretching a crosslinked solid by about a ratio of between about 3 and about 4. Such a process is physically difficult for most crosslinked coatings due to the limited extensibility of the materials. Therefore, we discovered a highly crosslinked coating that is not completely cured until the material enters the heat setting zone of the stenter. At this point, the coating is fully cured to produce a highly scratch resistant surface. Fully cured is an indication of the cross-link density of the film. We discovered that only highly crosslinked materials render useful properties. Such materials have a crosslink density of greater than about 50% of the reactive functional groups.

EXAMPLES

Test Methods

The following test methods were used to evaluate the film.
Taber abrasion

A Taber abrader model 5130 with CS-10 abrading wheels and 500 gram weights was used in this test for up to 150 cycles. Taber abrasion testing is a standard method for the evaluation of the durability of a surface for abrasion resistance. Haze testing Haze values were taken before and after abrading with the Taber abrasion equipment via the utilization of a Suga digital haze meter. Differences in haze before and after abrasion are an indication of the level of surface scratching that a material receives. A high delta haze is characteristic of a material with poor abrasion resistance. A delta haze of greater than about 20 units is considered poor abrasion resistance. Print Testing A 180P anilox roll handproofer was used to apply two of the leading Flexo water based inks from Sun Chemical and Color Converting to the coated surface. The ink was dried in a 120C oven for 10 seconds. The cross hatch tape test and the crease test were used to determine the level of ahesion of the coating to the substrate. Cross Hatch Tape Test The ink was cut with a multiple tooth cutter to cut through the ink applied to the coated film. A second cut intersected the first at 90 degrees. 3M 600 tape was applied to the inked cut surface with a 4 lb. Roller. The tape was removed immediately with a quick pull at 180 degree angle. The level of coating removal was used to judge the adhesion of the coating to the substrate, 5 being the best signifying no ink loss. Crease Test The inked film sample was folded over on itself and rolled with a 4 lb. roller. The sample was rated 1–5 for the amount of ink that flakes off at the crease, 5 being the best signifying no ink loss.

The following examples are illustrative of the invention, but are in no way considered to be limiting. Various changes to the examples are possible and should not limit the functional scope of the examples or the appended claims.

Reference Example 1

Hardcoat solar film was obtained from Madico, Inc. This film was prepared via offline coating the PET film with a thermally cured silicone hardcoating.

Reference Example 2

A commercially available silicone hardcoating, UVHC 8558 from GE Silicones. The coating was applied as supplied with a #5 wire-wound rod to 2Mil S105 PET film available from Toray Industries. The coating was cured under UV light at a pressure of 300 WPI at a line speed of 75 fpm in a mini conveyor UV curing unit, model #A012-005 manufactured by UV Process Supply Inc.

Reference Example 3

A commercially available silicone hardcoating, UVHC 8556 from GE Silicones, was used. The coating was applied as supplied with a #5 wire-wound rod to 2Mil S105 PET film available from Toray Industries. The coating was cured under UV light at a pressure of 300 WPI at a line speed of 75 fpm in a mini conveyor UV curing unit, model #A012-005 manufactured by UV Process Supply Inc.

Example 1

| Coating solution 1 | |
|---|---|
| Melamine Formaldehyde Resin (1) | 50 Parts |
| Fluorosurfactant (2) | 0.001 Parts |
| Phosphoric Acid catalyst (3) | 2 Parts |
| Deionized Water | 50 Parts |

(1) Cymel 373 sold by Cytec, Inc.
(2) Zoynl FSO sold by Dupont, Inc.
(3) Cycat 269 sold by Cytec, Inc.

A base film was prepared from dried PET pellets with 0.015% by weight of 0.4 um silica and 0.005% by weight of 1.4 um silica as fillers. This material was extruded onto a casting drum maintained at 25C and pinned down to the drum via electrostatic force. The base film was oriented in the MD direction at about a 3.3 draw ratio. The coating was applied with a #6 meyer rod. The film was then heated and stretched in the TD direction at a 3.3 draw ratio. Within the TD direction stretcher, i.e., the stenter, the coated film was exposed to 3 separate heating zones at 85C, 100C and 225C, respectively. The resultant clear films were wound for further evaluation.

Example 2

| Coating solution | |
|---|---|
| Melamine Formaldehyde Resin (4) | 50 Parts |
| Fluorosurfactant (2) | 0.001 Parts |
| Phosphoric Acid catalyst (3) | 2 Part |
| Deionized Water | 50 Parts |

(4) Cymel 385 sold by Cytec, Inc.

A base film was prepared from dried PET pellets with 0.015% by weight of 0.4 um silica and 0.005% by weight of 1.4 um silica as fillers. This material was extruded onto a casting drum maintained at 25C and pinned down to the drum via electrostatic force. The base film was oriented in the MD direction at about a 3.3 draw ratio. The coating was applied with a #6 meyer rod. The film was then heated and stretched in the TD direction at a 3.3 draw ratio. Within the TD direction stretcher (stenter), the coated film was exposed to 3 separate heating zones at 85C, 100C and 225C, respectively. The resultant clear films were wound for further evaluation.

Example 3

| Coating solution | |
|---|---|
| Melamine Formaldehyde Resin (4) | 50 Parts |
| Fluorosurfactant (2) | 0.001 Parts |
| Phosphoric Acid catalyst (3) | 2 Parts |
| Siloxane (5) | 2 Parts |
| Deionized Water | 50 Parts |

(5) Dow Corning 55 sold by Dow Corning, Inc.

A base film was prepared from dried PET pellets with 0.015% by weight of 0.4 um silica and 0.005% by weight of 1.4 um silica as fillers. This material was extruded onto a casting drum maintained at 25C and pinned down to the drum via electrostatic force. The base film was oriented in the MD direction at about a 3.3 draw ratio. The coating was applied with a #6 meyer rod. The film was then heated and stretched in the TD direction at a 3.3 draw ratio. Within the TD direction stretcher (stenter), the coated film was exposed to 3 separate heating zones at 85C, 100C and 225C, respectively. The resultant clear films were wound for further evaluation.

Example 4

| Coating solution | |
|---|---|
| Melamine Formaldehyde Resin (1) | 50 Parts |
| Fluorosurfactant (2) | 0.001 Parts |
| Phosphoric Acid catalyst (3) | 2 Parts |
| Silane (7) | 2 Parts |
| Deionized Water | 50 Parts |

(7) Silane Z6030 sold by Dow Corning, Inc.

A base film was prepared from dried PET pellets with 0.015% by weight of 0.4 um silica and 0.005% by weight of 1.4 um silica as fillers. This material was extruded onto a casting drum maintained at 25C and pinned down to the drum via electrostatic force. The base film was oriented in the MD direction at about a 3.3 draw ratio. The coating was applied with a #6 meyer rod. The film was then heated and stretched in the TD direction at a 3.3 draw ratio. Within the TD direction stretcher (stenter), the coated film was exposed to 3 separate heating zones at 85C, 100C and 225C, respectively. The resultant clear films were wound for further evaluation.

Comparative Examples

Comparative Example 1

| Coating solution 6 | |
|---|---|
| Glycoluril-Formaldehyde Resin (8) | 50 Parts |
| Water | 50 Parts |
| Fluorosurfactant (2) | .001 Parts |
| Phosphoric Acid catalyst (3) | 2 Parts |

(8) Cymel 1172 sold by Cytec, Inc.

Comparative Example 2

| Coating solution 7 | |
|---|---|
| Polyvinyl Alcohol Solution (9) | 16 Parts |
| Tetraethoxysilicate (10) | 25 Parts |
| Water | 38 Parts |
| Methacryloxypropyltrimethoxysilane (11) | 6 Parts |
| Siloxane (5) | 0.6 Parts |
| Isopropanol | 13 Parts |
| Fluorosurfactant (2) | 0.001 Parts |
| Phosphoric Acid catalyst (3) | 0.8 Parts |
| Acetylenic surfactant (12) | 0.15 Parts |

(9) Alcotek 89.9 sold by Harco, Inc.
(10) TEOS sold by Aldrich, Inc.
(11) Silane Z6030 sold by Dow Corning, Inc.
(12) Surfynol SE-F sold by Air Products, Inc.

Comparative Example 3

Plain PET - 2Mil Toray S105 corona treated. This film is a commercial PET film manufactured by Toray industries.

Comparative Example 4

| | |
|---|---|
| Water | 94 Parts |
| Acrylic Emulsion (13) | 6 Parts |
| Fluorosurfactant | 0.02 Parts |

(12) Sold by Akzo Nobel Resins as 33-3372

A base film was prepared from dried PET pellets with 0.015% by weight of 0.4 um silica and 0.005% by weight of 1.4 um silica as fillers. This material was extruded onto a casting drum maintained at 25C and pinned down to the drum via electrostatic force. The base film was oriented in the MD direction at about a 3.3 draw ratio. The coating was applied with a #6 meyer rod. The film was then heated and stretched in the TD direction at a 3.3 draw ratio. Within the TD direction stretcher (stenter), the coated film was exposed to 3 separate heating zones at 85C, 100C and 225C, respectively. The resultant clear films were wound for further evaluation.

| | Color Converting Ink | | Sun Chemical Ink | |
|---|---|---|---|---|
| Example | Cross hatch Test | Crease Test | Cross hatch Test | Crease Test |
| Ref 2 | 0 | 1 | 0 | 1 |
| Ref 3 | 0 | 1 | 0 | 1 |
| 2 | 4 | 3 | 5 | 3 |
| 3 | 4 | 3 | 5 | 3 |
| 4 | 2 | 2 | 2 | 2 |

Abrasion #6 rod @232C

| Example | Haze of coated film before abrading | 25X | 50X | 100X |
|---|---|---|---|---|
| Reference Example 1 | 1.0 | | | 7.4 |
| Reference Example 2 | 8.4 | | | |
| Reference Example 3 | 8.0 | | | |
| 1 | 1.3 | 18.0 | 26.2 | 26.2 |
| 2 | 9.2 | 14.3 | 19.1 | 36.1 |

| Example | Haze of coated film before abrading | 25X | 50X | 100X |
|---|---|---|---|---|
| 3 | 9.5 | 17.5 | 16.6 | 26.9 |
| 4 | 12.3 | 19.4 | 23.8 | 28.4 |
| Comparative Example 1 | Too Hazy To Test | | | |
| Comparative Example 2 | Too Hazy To Test | | | |
| Comparative Example 3 | 7.6 | 23.3 | 29.8 | 36.9 |
| Comparative Example 4 | 4.0 | | | |

As can be readily noted, our discovery of an inline processable abrasion resistant coating gives similar functional performance to offline coated materials. In our experience, Taber abrasion testing is illustrative of the issues related to abrasion resistance. Low haze change after abrasion testing is a good indication that materials will have excellent functional resistance to scratching and abrasion in the use of the film in the typically converting and enduse processes.

What is claimed is:

1. A biaxially oriented print receptive and abrasion resistant coated film comprising a polyester film and a coating consisting essentially of hexamethoxymethyl melamine having a methylation content of greater than about 30% and a crosslinking density of greater than about 50% and less than about 100% coated on the polyester layer, wherein the coating is cured after transverse stretching and heat setting the film.

2. The coated film of claim 1, wherein the coating is about 0.2 $\mu$m–about 2.0 $\mu$m in thickness.

3. The abrasion resistant coated film of claim 1, wherein the polyester film is polyethyleneterephthalate.

4. The coated film of claim 1, wherein the melamine contains between about 0.01% by weight and about 1.0% by weight of a colloidal particle selected from the group consisting of silica, $TiO_2$, graphite and blends thereof.

* * * * *